US008965123B2

(12) United States Patent
Chattopadhyay et al.

(10) Patent No.: US 8,965,123 B2
(45) Date of Patent: Feb. 24, 2015

(54) SYSTEM AND METHOD FOR PROCESSING IMAGE FOR IDENTIFYING ALPHANUMERIC CHARACTERS PRESENT IN A SERIES

(71) Applicants: Tata Consultancy Services Limited, Mumbai, Maharashtra (IN); Indian Statistical Institute, Kolkata, West Bengal (IN)

(72) Inventors: Tanushyam Chattopadhyay, West Bengal (IN); Ujjwal Bhattacharya, West Bengal (IN); Bidyut Baran Chaudhuri, West Bengal (IN)

(73) Assignee: Tata Consultancy Services Limited, Maharashtra (IN)

( * ) Notice: Subject to any disclaimer, the term of this patent is extended or adjusted under 35 U.S.C. 154(b) by 80 days.

(21) Appl. No.: 13/849,588

(22) Filed: Mar. 25, 2013

(65) Prior Publication Data

US 2013/0272607 A1     Oct. 17, 2013

(30) Foreign Application Priority Data

Mar. 26, 2012   (IN) ................. 825/MUM/2012

(51) Int. Cl.
  *G06K 9/00*   (2006.01)
  *G06K 9/34*   (2006.01)
  *G06K 9/38*   (2006.01)
(52) U.S. Cl.
  CPC . *G06K 9/344* (2013.01); *G06K 9/38* (2013.01)
  USPC ........................................ 382/171; 382/177

(58) Field of Classification Search
  USPC ......... 382/103–105, 162, 165, 169, 170–172, 382/177, 260–273
  See application file for complete search history.

(56) References Cited

U.S. PATENT DOCUMENTS

| 6,026,177 | A | 2/2000 | Mong et al. | |
| 6,473,517 | B1 * | 10/2002 | Tyan et al. | 382/105 |
| 7,333,676 | B2 * | 2/2008 | Myers et al. | 382/289 |
| 7,613,328 | B2 | 11/2009 | Boregowda et al. | |
| 8,290,213 | B2 | 10/2012 | Chen et al. | |

OTHER PUBLICATIONS

Shigueo Nomura, Keiji Yamanaka, Osamu Katai, Hiroshi Kawakami, Takayuki Shiose "A novel adaptive morphological approach for degraded character image segmentation".
Keechul Jung, Kwang In Kim, Anil K. Jain "Text Information Extraction in Images and Video: A Survey".
Huyphatle,Toan Nguyen Dinh,Soohyung Kim, Guee Sang Lee "Text Detection in Binarized Text Images of Korean Signboard by Stroke Width Feature".

(Continued)

*Primary Examiner* — Yon Couso
(74) *Attorney, Agent, or Firm* — Hayes Soloway PC

(57) ABSTRACT

A system and a method for identification of alphanumeric characters present in a series in an image are disclosed. The system and method captures the image and further processes it for binarization by computing a pattern of the image. The generated binarized images are then filtered for removing unwanted components. Candidate images are identified out of the filtered binarized images. All the obtained candidate images are combined to generate a final candidate image which is further segmented in order to recognize a valid alphanumeric character present in the series.

14 Claims, 4 Drawing Sheets

(56) References Cited

OTHER PUBLICATIONS

P. R. Sanap and S. P. Narote "License Plate Recognition System-Survey".

Kaushik Deb, Hyun-Uk Chae and Kang-Hyun Jo "Vehicle License Plate Detection Method Based on Sliding Concentric Windows and Histogram" "Journal of Computers, vol. 4, No. 8, Aug. 2009".

* cited by examiner

SYSTEM AND METHOD FOR PROCESSING IMAGE FOR IDENTIFYING ALPHANUMERIC CHARACTERS PRESENT IN A SERIES

FIELD OF THE INVENTION

The present invention in general relates to method and system for character identification. More particularly, the invention relates to a method and system for identifying alphanumeric characters present in a series in an image.

BACKGROUND OF THE INVENTION

The images of the Vehicle Identification Number (VIN) are captured by the mobile phone camera by common people many of the times for some specific purpose in some extraordinary situations. Manual involvement in the capturing process, uneven and insufficient illumination, and unavailability of sophisticated focusing system yield poor quality images.

The performance of available open source Optical Character Recognition (OCR) systems on VIN images captured by mobile phones is extremely poor because of the image quality affected by various noises. Therefore, image enhancement techniques need to be used before giving a scanned image as an input to Optical character recognition system. Binarization technique is used as an image enhancement technique to get the text region from a complex background, more specifically the background texts.

The OCR for texts in mobile camera captured images consists of a variety of shortcomings. In the existing system, it is required to extract individual characters on embedded mobile platform which has low memory and processing speed. Binarization technique is used as an image enhancement technique to get the text region from a complex background, more specifically the background texts. Many Binarization techniques have been proposed to improve the recognition accuracy of the images. The existing Binarization techniques can improve the recognition accuracy of the images only up to 5.89% at most.

Therefore, there is a need of a system and method capable of providing a suitable low complexity binarization technique which would improve the recognition accuracy of an image to a greater extent.

OBJECTS OF THE INVENTION

It is the primary object of the invention to provide a system and method for identification of alphanumeric characters present in a series in an image.

It is another object of the invention to provide a system and method for performing binarization of the image thus captured.

It is yet another embodiment of the invention to provide a system and method for removing unwanted, over-segmented and under-segmented segments from the binarized images.

It is yet another object of the invention to provide a system and method for applying morphological closing for merging the multiple component labels in the valid alphanumeric characters.

SUMMARY OF THE INVENTION

The present invention provides a method for identification of alphanumeric characters present in a series in an image. The method comprises of processor implemented steps of capturing the image comprising the series of alphanumeric characters and processing the image for producing a set of identifiable characters out of the series of alphanumeric characters. The processing further comprises of computing a pattern for recognizing a pixel intensity distribution in the image for determining a background peak and a foreground peak, generating a plurality of binarized images by selecting a plurality of dynamic threshold values between the background peak and the foreground peak and filtering the generated binarized images by removing unwanted components from plurality of images to identify one or more valid characters. The processing further comprises of identifying one or more candidate images by comparing the valid characters with respect to a known ground truth value, generating a final candidate image by combining the candidate images such that the combination of the candidate images is dependent upon a predefined condition and splitting the final candidate image into a predefined segments and recognizing a valid alphanumeric character associated with each segment therein.

The present invention also provides a system for identification of alphanumeric characters present in a series in an image. The system comprises of an image capturing device for capturing the image comprising the alphanumeric characters present in the series and a processor configured to produce a set of identifiable characters out of the series of alphanumeric characters. The processor further comprises of a computing module configured to compute a pattern for recognizing a pixel intensity distribution in the image for determining a background peak and a foreground peak, a binarization module configured to generate a plurality of binarized images by selecting a plurality of dynamic threshold values between the background peak and the foreground peak and a filter configured to remove unwanted components from the plurality of images to identify one or more valid characters. The processor further comprises of a comparator configured to compare the valid characters with respect to a known ground truth value in order to identify one or more candidate images and an image generator configured to generate a final candidate image by combining the candidate images such that the combination of the candidate images is dependent upon a predefined condition. The system further comprises of an output generating module configured to split the final candidate image into a predefined segments and recognizing a valid alphanumeric character associated with each segment therein.

DETAILED DESCRIPTION

Some embodiments of this invention, illustrating its features, will now be discussed:

The words "comprising", "having", "containing", and "including", and other forms thereof, are intended to be equivalent in meaning and be open ended in that an item or items following any one of these words is not meant to be an exhaustive listing of such item or items, or meant to be limited to only the listed item or items.

It must also be noted that as used herein and in the appended claims, the singular forms "a", "an", and "the" include plural references unless the context clearly dictates otherwise. Although any systems, methods, apparatuses, and devices similar or equivalent to those described herein can be used in the practice or testing of embodiments of the present invention, the preferred, systems and parts are now described. In the following description for the purpose of explanation and understanding reference has been made to numerous embodiments for which the intent is not to limit the scope of the invention.

One or more components of the invention are described as module for the understanding of the specification. For example, a module may include self-contained component in a hardware circuit comprising of logical gate, semiconductor device, integrated circuits or any other discrete component. The module may also be a part of any software programme executed by any hardware entity for example processor. The implementation of module as a software programme may include a set of logical instructions to be executed by the processor or any other hardware entity. Further a module may be incorporated with the set of instructions or a programme by means of an interface.

The disclosed embodiments are merely exemplary of the invention, which may be embodied in various forms.

The present invention relates to a system and a method for identification of alphanumeric characters present in a series in an image. In the very first step, two major peaks are identified from a pattern of the scale image and a number of binarized images are obtained. The components which are unwanted are removed from the binarized images. Further, one or more candidate images are segmented such that each segment contains a valid character in order to generate a final candidate image.

Figure 1:
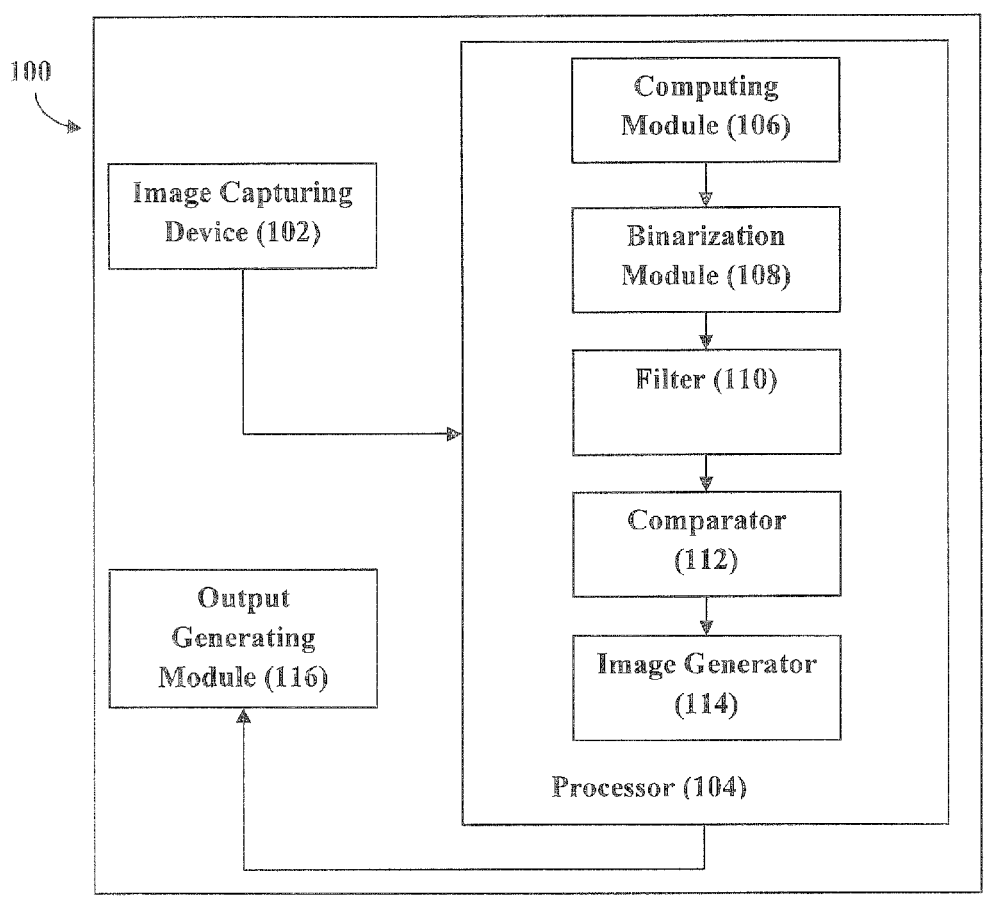
FIG. 1 illustrates the system architecture in accordance with an embodiment of the invention.
Figure 2:
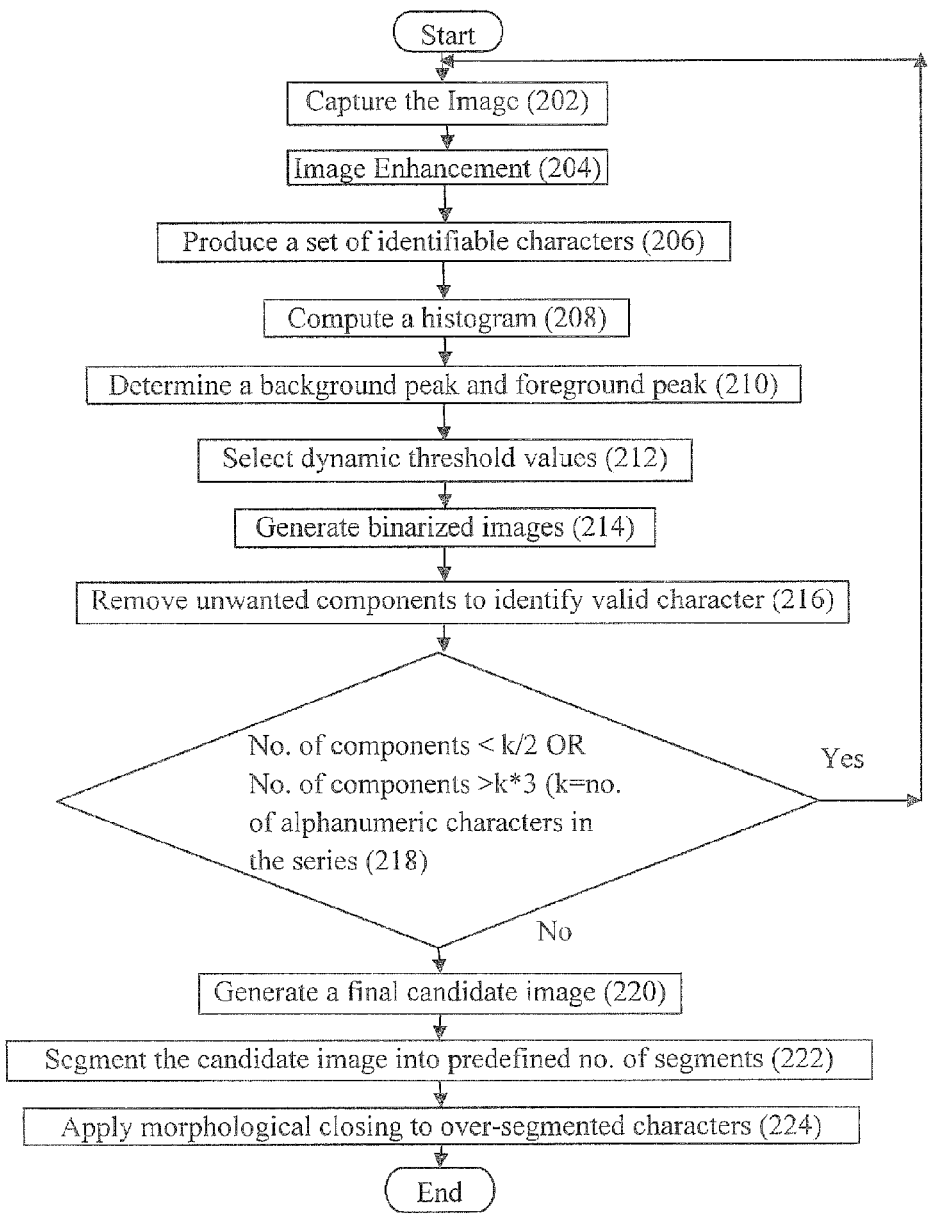
FIG. 2 illustrates an exemplary flowchart in accordance with an alternate embodiment of the invention.

In accordance with an embodiment, referring to FIG. 1, the system (100) comprises of an image capturing device (102) adapted to capture the image comprising the alphanumeric characters present in the series (as shown in step 202 of FIG. 2). The system further comprises of a processor (104) which is configured to produce a set of identifiable characters out of the series of alphanumeric characters (as shown in step 206 of FIG. 2). The processor further comprises of a computing module (106), a binarization module (108), a filter (110), a comparator (112) and an image generator (114).

In accordance with an embodiment, still referring to FIG. 1, the image capturing device captures the image in a gray scale. The image capturing device may include a camera. This camera may be coupled to some other electronic device. By way of specific example, the camera may be present in a mobile phone. The images are captured by the image capturing device (102) in a plurality of frames. These images may again comprise of a series of alphanumeric characters to be further identified and hence may include one or more type of noise. The captured images are further processed by the processor. The processor (104) then produces a set of identifiable characters out of the series of alphanumeric characters present in the image.

By way of a specific example, the number of alphanumeric characters present in the series may include but is not limited to 17 alphanumeric characters.

The processor (104) further comprises of a computing module (106) which is configured to compute a pattern for recognizing a pixel intensity distribution in the image for determining a background peak and a foreground peak. The pixel intensity is recognized in a form of a histogram.

The computing module (106) enhances the quality of the input image by applying the retinex strategy (as shown in step 204 of FIG. 2). The image enhancement is based on two main observations that there are two sources of noises. One is multiplicative in nature that appears due to the background text and the reflection from the glass. The computing module (106) further converts the image into a gray scale image. A gray scale image is one in which the only colors are shades of gray. An intensity histogram of the gray scale image is computed which is a graph showing the number of pixels in an image at each different intensity value found in that image (as shown in step 208 of FIG. 2). By way of specific example, for an 8-bit grayscale image there are 256 different possible intensities, and so the histogram will graphically display 256 numbers showing the distribution of pixels amongst those grayscale values. Further, from this intensity distribution two major peaks are identified, one located near the value 0 and the other located near the value 255 (as shown in step 210 of FIG. 2). These peaks are represented as the background part and the foreground part of the image respectively.

The processor (104) further comprises of the binarization module (108) which is configured to generate a plurality of binarized images.

In accordance with an embodiment, the disclosed binarization method is based on two main observations that there is a slight gray scale variation between the background text (BGT) and the text of interest (TOI) and strictly 17 alphanumeric characters are present in the captured image. A specific number (n) of dynamic threshold values (pixel values) between the background peak and the foreground peak are used for binarization (as shown in step 212 of FIG. 2). For an image in 8 bits per pixel format, this number is 16 which are obtained heuristically. Thus, n numbers of binarized images are obtained from the single gray scale image (as shown in step 214 of FIG. 2).

In accordance with an embodiment, the foreground pixels of each such image is labeled using Connected-component labeling method. Connected-component labeling is an algorithmic application of graph theory, where subsets of connected components are uniquely labeled based on a given heuristic. A graph, containing vertices and connecting edges, is constructed from the input image. The vertices contain information required by the comparison heuristic, while the edges indicate connected 'neighbors'. An algorithm traverses the graph, labeling the vertices based on the connectivity and relative values of their neighbors. Following the labeling stage, the graph may be partitioned into subsets, after which the original information can be recovered and processed.

The processor (104) further comprises of a filter (110) which is configured to remove unwanted components from the n number of binarized images to identify one or more valid characters (as shown in step 216 of FIG. 2). The components that are too small or too big are removed. A component is defined to be too small if the number of pixels with that particular level is less than 100 or if the component has a height (h) or width (w) less than 3 pixels. Similarly, a component is defined to be too big if the number of pixels with that particular level is more than width/4 or if, $$h > (ht\_image/3) \text{ or}$$

$$w > (wd\_image/4)$$

where, ht_image is the height of the image and wd_image is the width of the image.

The processor (104) further comprises of a comparator (112) configured to compare the valid characters with respect to a known ground truth value in order to identify one or more candidate images. The known ground truth value (k) is equal to the number of alphanumeric characters present in the series.

The comparator (112) is used to remove the unwanted components in order to identify the candidate images. If the number of components is less than k/2, it means that actual k number of characters is either very under segmented or the binarized image doesn't include all valid characters as foreground (as shown in step 218 of FIG. 2). So this binarized image is not considered as a candidate image. Similarly, if the number of components are greater than k*3 then on the average one valid character is over segmented to more than 3 segments (as shown in step 218 of FIG. 2). The over-segmented and under segmented binarized images are disregarded. The remaining binarized images are considered as the candidate images. Thus, only a few valid images are left out of n binarized images. Typically, the number of such candidate images for each input image is less than or equal to 3 (for a case where number of alphanumeric characters present in the series are 17).

The processor (104) further comprises of an image generator (114) which is configured to generate a final candidate image by combining the candidate images (as shown in step 220 of FIG. 2). The candidate images are combined by marking the pixels as background text (BGT) only if it is decided as a background text in more than half of the candidate images. On the fulfillment of this predefined condition, the final candidate image is constructed.

The system (100) further comprises of an output generating module (116) which is configured to split the final candidate image into a predefined segments such that each segment contains only one valid character. The candidate image is split into a number equal to the number of alphanumeric characters present in the series (as shown in step 222 of FIG. 2).

In accordance with an embodiment, a conventional method of skew correction is used prior to the segmentation. The following method of segmentation is based on the observation that the number of valid characters is equal to the number of alphanumeric characters present in the series (k). The steps involved in the character and numeral segmentation and recognition method is as follows:

Identify the columns without any foreground pixel. If consecutive such rows are attained, the middle of these columns is taken as the candidate cut column (CCC). Let the number of CCC obtained be n.

Find the distance ($\delta$) between the consecutive CCCs. Let the distance between the $i^{th}$ and the $(i+1)^{th}$ CCC be defined as $\delta_i = |CCC_{i+1} - CCC_i|$ Find the median $(med_\delta)$ of $\delta_i \forall i \in (1, 2, \ldots, n)$ wherein is the number of CCCs in the image. A heuristically obtained tolerance factor $\tau$ is used to define the threshold $(Th_\delta)$ which is defined as $Th_\delta = (med_\delta - \tau)$.

If k−1 components are obtained which are nearly equally spaced columns, each segment is used as a candidate segment.

If n>k−1 then it is concluded that some valid character is horizontally over segmented. Subsequently such CCC's are merged and n is reduced by one iteratively.

If n<k−1, then it is concluded that there is definitely some valid characters touching each other.

Thus, k numbers of segments are obtained, each having a valid character. The segments obtained may be in over segmented form.

Figure 3A:
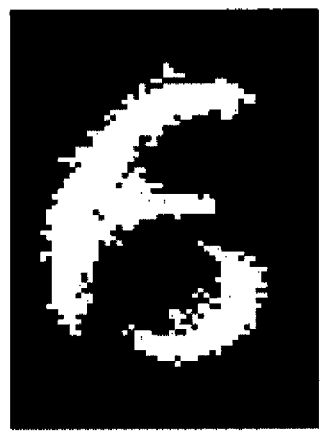
FIGS. 3A and 3B illustrates the form of image after applying morphological closing in accordance with an alternate embodiment of the system.
Figure 3B:

In accordance with an embodiment, referring to FIG. 3, if any such segment includes multiple component labels, they are merged by applying a morphological closing (as shown in step 224 of FIG. 2). The FIG. 3(a) shows an over-segmented character and FIG. 3b) shows the same character after applying morphological closing. Closing is similar to as if opening is performed in reverse. It is defined simply as dilation followed by erosion using the same structuring element for both operations. The closing operator therefore requires two inputs: an image to be closed and a structuring element. Gray level closing consists straightforwardly of a gray level dilation followed by gray level erosion. Closing is the dual of opening, i.e. closing the foreground pixels with a particular structuring element, is equivalent to closing the background with the same element.

Figure 4A:
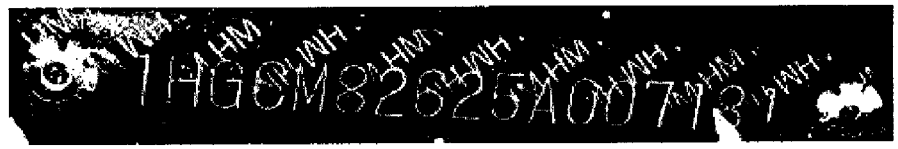
FIGS. 4A, 4B, 4C, 4D, 4E, 4F and 4G illustrates comparative analyses of the binarization technique of the present invention with those of the prior arts in accordance with an embodiment of the invention.
Figure 4B:
Figure 4C:
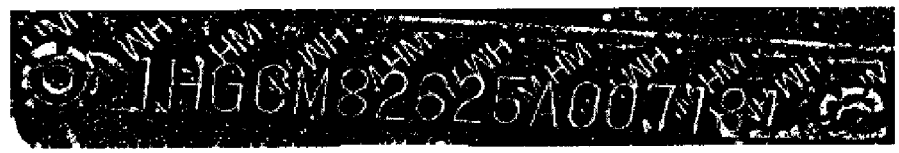
Figure 4D:
Figure 4E:
Figure 4F:
Figure 4G:

In accordance with an embodiment, FIG. 4(g) illustrates the improved results of binarization technique as disclosed in the present invention with respect to prior arts shown in FIGS. 4(a), (b), (c), (d), (e) and (f).

BEST MODE/EXAMPLE FOR WORKING OF THE INVENTION

The system and method illustrated for identification of alphanumeric characters present in a series in an image may be illustrated by working example stated in the following paragraph; the process is not restricted to the said example only:

Let us consider an image of a vehicle identification number (VIN) captured by a person through his camera of resolution 2 mega pixel in his mobile. Let us consider the image is affected by plurality of noise (mud on number plate, shadow of some other vehicle etc). Let originally the number is MH05 1424 66720087 (17 numbers including 2 alphabets). Out which the number and/or alphabets which are clear include M-05 14-4 - - - 2008- (rest of the numbers are partially identifiable). This image comprising numbers and alphabets before being identified by OCR (Optical character recognition) is enhanced by the above described method and system. The histogram is first computed giving the peak points of background and foreground. This gives a threshold value (say 16) by which a plurality of binarized images are obtained.

These binarized images are further filtered and unwanted are removed and certain valid characters are obtained. These valid characters are used for identifying candidate images by comparing it to a ground truth value (which in our case is 17). Now, a final candidate image is created by combining these small candidate images and thus missing characters are identified.

This process is repeated for identification of all the missing or noise affected characters and finally the quality of image is enhanced before being processed by the OCR.

We claim:
1. A method for identification of alphanumeric characters present in a series in an image, the method comprising steps of:
   capturing the image comprising the series of alphanumeric characters;
   processing, by a processor of a computerized device, the image for producing a set of identifiable characters out of the series of alphanumeric characters; the processing further comprising:
      computing, by the processor, a pattern for recognizing a pixel intensity distribution in the image for determining a background peak and a foreground peak;
      generating, by the processor, a plurality of binarized images by selecting a plurality of dynamic threshold values between the background peak and the foreground peak;

filtering, by the processor, the generated binarized images by removing unwanted components from plurality of images to identify one or more valid characters;

identifying, by the processor, one or more candidate images by comparing the valid characters with respect to a known ground truth value;

generating, by the processor, a final candidate image by combining the candidate images such that the combination of the candidate images is dependent upon a predefined condition; and splitting, by the processor, the final candidate image into a predefined segments and recognizing a valid alphanumeric character associated with each segment therein.

2. The method as claimed in claim 1, wherein the series of alphanumeric characters includes but is not limited to 17 alphanumeric characters.

3. The method as claimed in claim 1, wherein the pattern for recognizing the pixel intensity is in a form of histogram.

4. The method as claimed in claim 1, wherein the plurality of pixel values depends upon the number of alphanumeric characters present in the series.

5. The method as claimed in claim 1, wherein the unwanted components comprises of too big and too small components, such that a component is too small if the number of pixels with that particular level is less than 100 and a component is too big if the number of pixels with that particular level is width/4.

6. The method as claimed in claim 1, wherein the one or more candidate images are identified by disregarding over-segmented and under-segmented binarized images.

7. The method as claimed in claim 1, wherein the ground truth value is equal to the number of alphanumeric characters present in the series.

8. The method as claimed in claim 1, wherein the predefined condition for combining the candidate images refers to marking the pixels of all the candidate images as background if more than half of the candidate images are background.

9. The method as claimed in claim 1, wherein the candidate image is split into a number equal to the number of alphanumeric characters present in the series.

10. The method as claimed in claim 1, wherein the multiple component labels in the valid alphanumeric character are merged by applying morphological closing.

11. A system for identification of alphanumeric characters present in a series in an image, the system comprising:

an image capturing device for capturing the image comprising the alphanumeric characters present in the series;

a processor configured to produce a set of identifiable characters out of the series of alphanumeric characters;

the processor further comprising:

a computing module configured to compute a pattern for recognizing a pixel intensity distribution in the image for determining a background peak and a foreground peak;

a binarization module configured to generate a plurality of binarized images by selecting a plurality of dynamic threshold values between the background peak and the foreground peak;

a filter configured to remove unwanted components from the plurality of images to identify one or more valid characters;

a comparator configured to compare the valid characters with respect to a known ground truth value in order to identify one or more candidate images;

an image generator configured to generate a final candidate image by combining the candidate images such that the combination of the candidate images is dependent upon a predefined condition; and an output generating module configured to split the final candidate image into a predefined segments and recognizing a valid alphanumeric character associated with each segment therein.

12. The system as claimed in claim 11, wherein the image capturing device includes a camera.

13. The system as claimed in claim 11, wherein the computing module computes a histogram pattern for recognizing the pixel intensity.

14. The system as claimed in claim 11, wherein the captured image includes 17 alphanumeric characters present in the series.

* * * * *

UNITED STATES PATENT AND TRADEMARK OFFICE
CERTIFICATE OF CORRECTION

PATENT NO. : 8,965,123 B2  
APPLICATION NO. : 13/849588  
DATED : February 24, 2015  
INVENTOR(S) : Chattopadhyay et al.

Page 1 of 1

It is certified that error appears in the above-identified patent and that said Letters Patent is hereby corrected as shown below:

Title Page, please insert second assignee as follows:

(73)   Assignee: --Indian Statistical Institute, Kolkata (IN)--

Signed and Sealed this  
Second Day of February, 2016

Michelle K. Lee  
*Director of the United States Patent and Trademark Office*